July 19, 1932.  H. W. DITCH  1,868,349
TREE TRIMMER
Filed Sept. 22, 1931    4 Sheets-Sheet 1

Inventor
H. W. Ditch
By Clarence A. O'Brien
Attorney

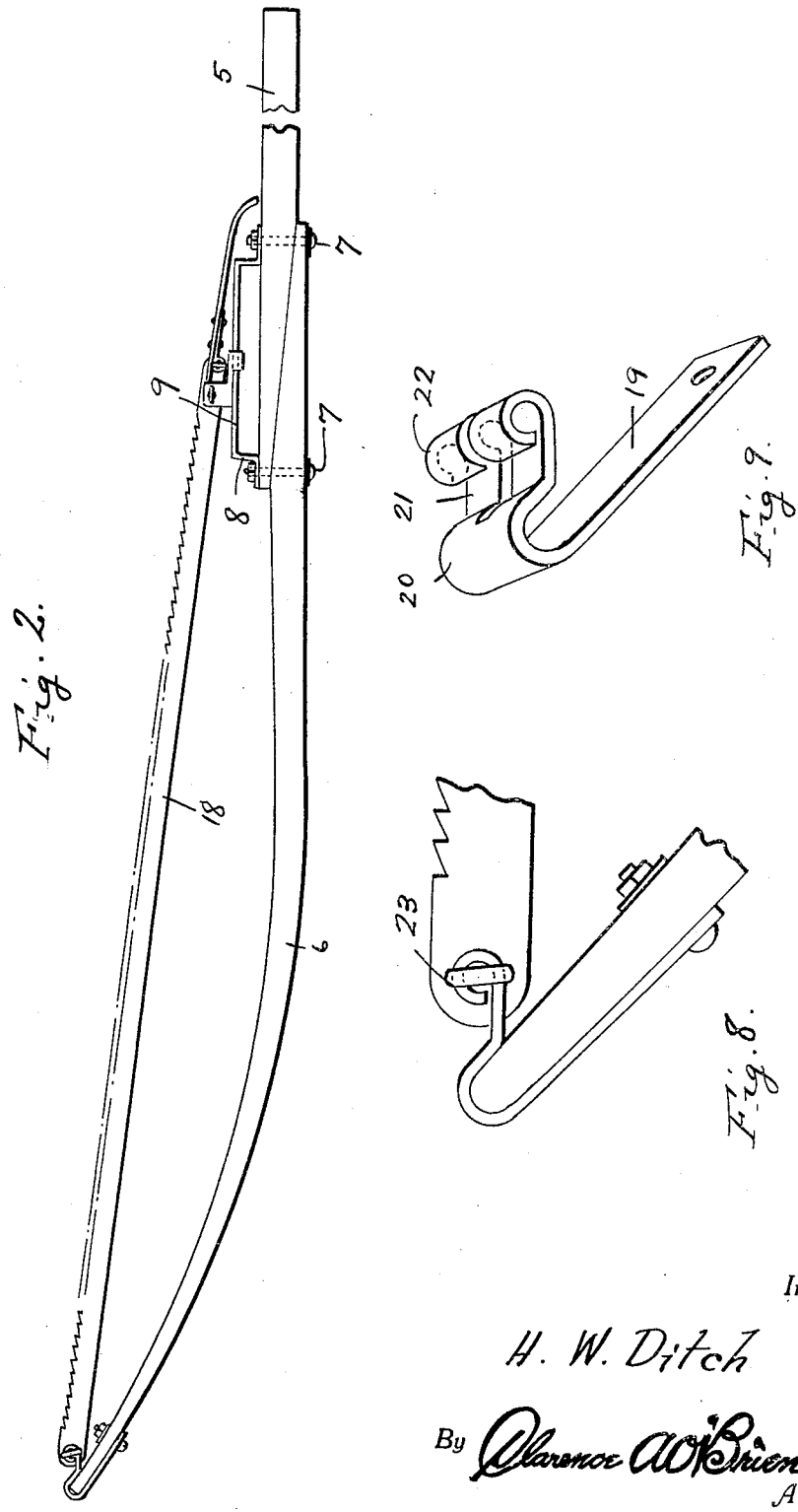

July 19, 1932.  H. W. DITCH  1,868,349
TREE TRIMMER
Filed Sept. 22, 1931  4 Sheets-Sheet 3
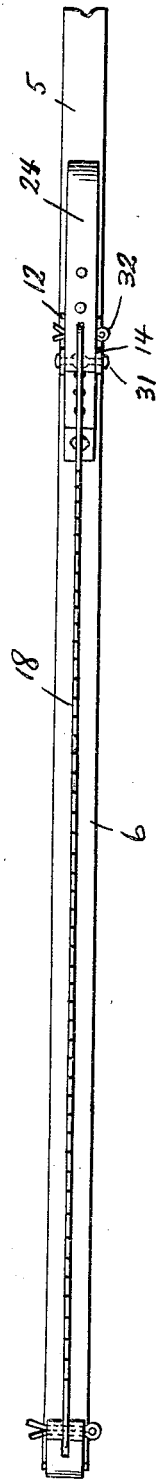
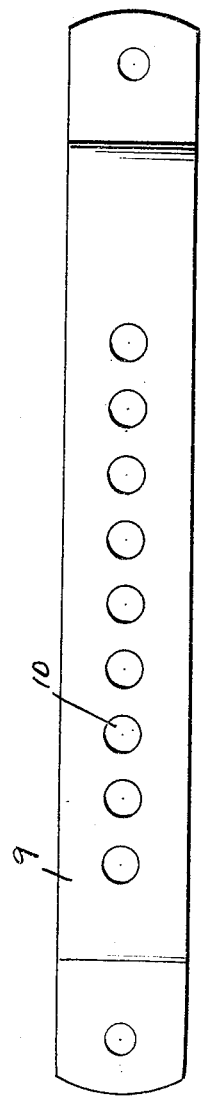
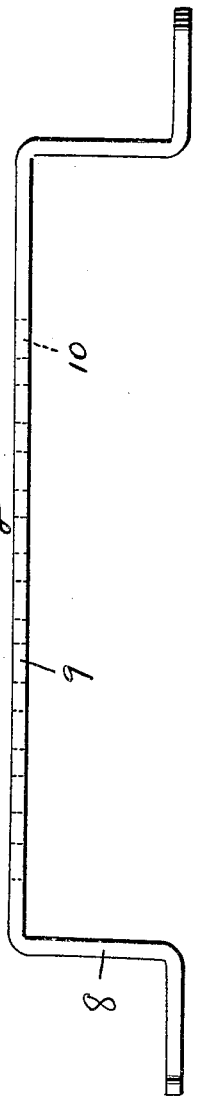
Inventor
H. W. Ditch
By Clarence A. O'Brien
Attorney July 19, 1932.  H. W. DITCH  1,868,349
TREE TRIMMER
Filed Sept. 22, 1931  4 Sheets-Sheet 4
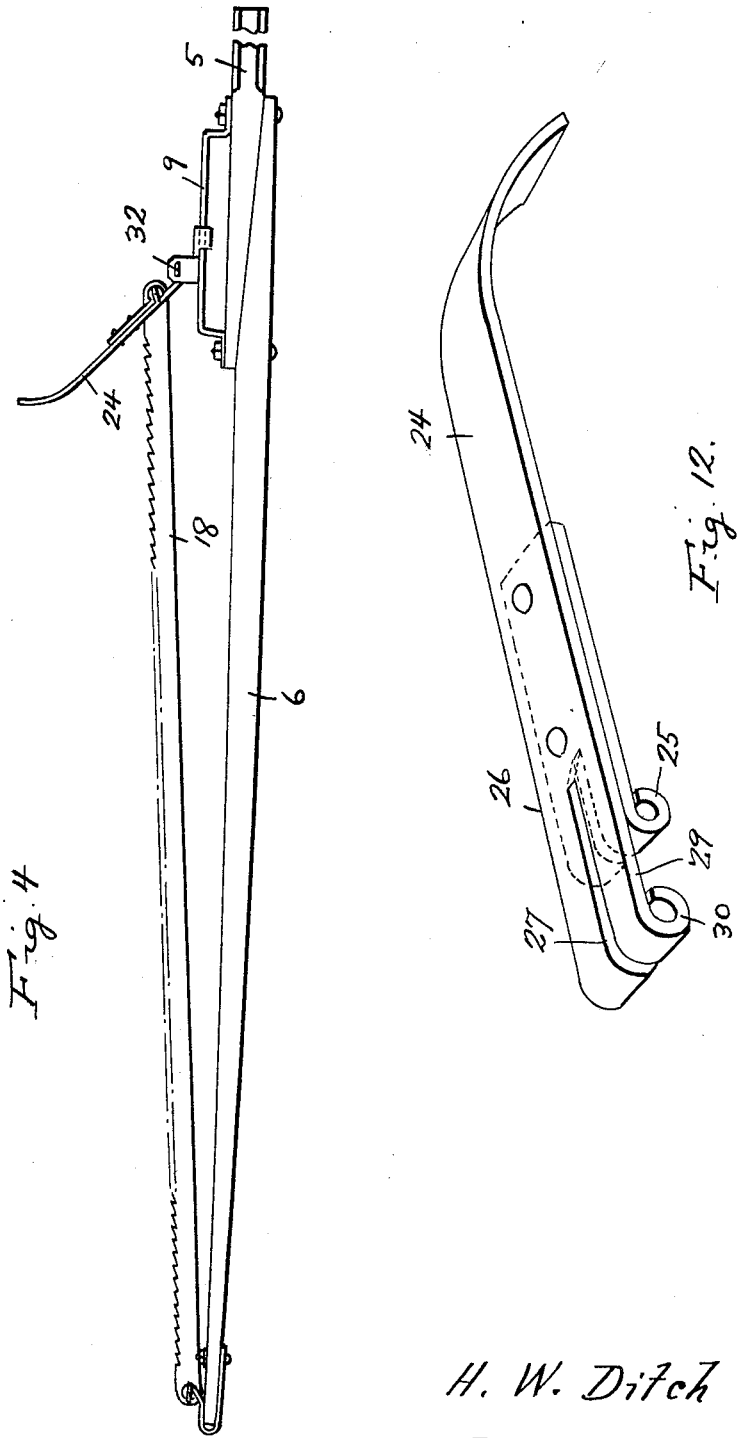
Inventor
H. W. Ditch
By Clarence A O'Brien
Attorney Patented July 19, 1932

1,868,349

UNITED STATES PATENT OFFICE

HARRY W. DITCH, OF MASON CITY, IOWA

TREE TRIMMER

Application filed September 22, 1931. Serial No. 564,399.

The present invention relates to a tree trimmer and has for its prime object to provide novel means for tensioning the saw blade, said means being releasable when not in use.

Another very important object of the invention resides in the provision of a saw blade tensioning feature for a tree trimmer which is easy to manipulate and adjust.

A further very important object of the invention resides in the provision of a tree trimmer of this nature which is simple in its construction, inexpensive to manufacture, strong and durable, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 2 is another side elevation thereof on a larger scale particularly illustrating the bow holding the blade under tension.

Figure 3 is a plan view thereof.

Figure 4 is a view similar to Figure 2 but showing the tensioning device released.

Figure 8 is a detail view of the end bracket on the bowl.

Figure 9 is a perspective view thereof.

Figure 10 is a plan view of the stationary bracket.

Figure 11 is a side elevation thereof, and

Figure 12 is a perspective view of the lever.

Figure 1:
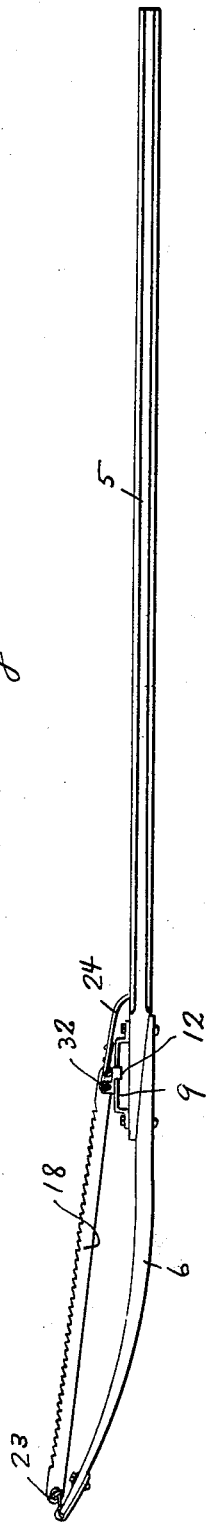
Figure 1 is a side elevation of a tree trimmer embodying the features of my invention.
Figure 7:
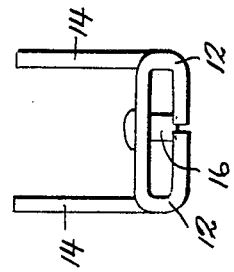
Figure 7 is an end elevation thereof.
Figure 6:
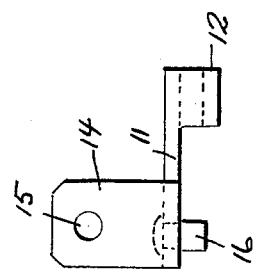
Figure 6 is a side elevation thereof.
Figure 5:
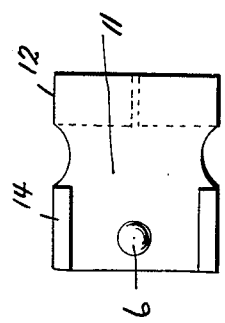
Figure 5 is a plan view of the sliding bracket.

Referring to the drawings in detail it will be seen that numeral 5 denotes an elongated handle having one end mitered and numeral 6 denotes an elongated bow of resilient material having one end mitered to fit the mitered end of the handle 5 and to be bolted thereto as at 7. The bolts 7 also engage angular ends 8 of an elongated stationary bracket plate 9 having a longitudinal series of openings 10.

A sliding bracket is on the plate 9 and comprises a plate body 11 having at one end side fingers 12 curved thereunder to extend under the plate 9 and at its other end rising ears 14 apertured as at 15. A pin 16 is provided in the plate body 11 between the ears 14 to engage in a selected opening 10. The fingers 12 provide sufficient play so that the sliding bracket may be tilted to release the pin from an opening 10 and allow the sliding bracket to be slid for engaging the pin in another one of the openings.

Numeral 18 denotes an elongated saw blade. A bracket 19 is mounted on the other end of the bolt 6 and curves over the end thereof as at 20 and merges into furcations 21 which terminate in sleeves 22 through which a cotter pin 23 may be inserted and also inserted through an opening in one end of the saw blade 18.

Numeral 24 denotes an elongated lever having one end bifurcated and terminating in sleeves 25. A plate 26 is riveted to the lever 24 and extends beyond the end having the sleeves 25 and is slotted as at 27 to form furcations 29 which terminate in sleeves 30. Rivets 31 in the sleeves 30 are rockable in the openings 15. A cotter pin extends through the sleeves 25 and through an opening in the other end of the saw blade 18.

When the lever is rocked from the position shown in Figure 4 to the position shown in Figure 2 it will be seen that the saw 6 is flexed to place the desired tension on the blade 18. This tension is regulated by the adjustment of the movable bracket on the stationary bracket.

When the lever is in the position shown in Figure 2 it will be seen that the cotter pin 32 is below a line drawn through the level of the rivets 31 and the cotter pin 23. It is only necessary to lift the lever slightly from the position shown in Figure 2 and the bow 6 will tend to straighten out.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

A tree trimmer comprising a handle, a resilient bow fixed to said handle, a blade pivoted at one end to the free end of said bow, blade tensioning means associated with the opposite end of said blade including a substantially U-shaped stationary bracket having its leg portions secured to said handle and its bight portion arranged in spaced relation to the handle and provided with a longitudinal series of openings, a second bracket slidably and adjustably mounted upon the bight portion of said first-named bracket and having a projection selectively engageable in said openings for holding the adjustable bracket in different adjusted positions, and a lever having one end rockably mounted upon said adjustable bracket and pivotally connected at a point spaced from its rockably mounted end to one end of said blade, said lever having a longitudinal slot through which said blade is adapted to pass.

In testimony whereof I affix my signature.

HARRY W. DITCH.